United States Patent [19]

Murao

[11] Patent Number: 5,010,394
[45] Date of Patent: Apr. 23, 1991

[54] AUTOMATIC WHITE BALANCE CIRCUIT CAPABLE OF EFFECTIVELY ADJUSTING WHITE BALANCE UNDER A FLASHING LIGHT SOURCE

[75] Inventor: Fumihide Murao, Itami, Japan

[73] Assignee: Mitsubishi Denki Kabushiki Kaisha, Tokyo, Japan

[21] Appl. No.: 387,999

[22] Filed: Aug. 1, 1989

[30] Foreign Application Priority Data

Jan. 18, 1989 [JP] Japan .................................. 1-9016

[51] Int. Cl.$^5$ .......................................... H04N 9/73 C
[52] U.S. Cl. ........................................ 358/29; 358/41
[58] Field of Search .................. 358/29, 29 C, 41, 43, 358/44, 225, 209; 354/132, 145.1

[56] References Cited

U.S. PATENT DOCUMENTS

| | | | |
|---|---|---|---|
| 4,422,743 | 12/1983 | Izumi et al. ...................... | 354/145.1 |
| 4,584,598 | 4/1986 | Kutaragi .............................. | 358/29 |
| 4,847,680 | 7/1989 | Okino ................................... | 358/41 |
| 4,879,600 | 11/1989 | Ise et al. ........................... | 358/213.19 |

FOREIGN PATENT DOCUMENTS 59-141888 8/1984 Japan
61-128693 6/1986 Japan .

Primary Examiner—James J. Groody
Assistant Examiner—Kim Yen Vu
Attorney, Agent, or Firm—Oblon, Spivak, McClelland, Maier & Neustadt

[57] ABSTRACT

A holding circuit holds and outputs an output value of ratio signal generating means corresponding to the maximum value of illuminance of light which is emitted from a light source. A flashing light source detecting circuit detects the number of flashing times of the light source, to output a first signal when the number of flashing times exceeds a prescribed number, while outputting a second signal when the former is less than the latter. A switch circuit outputs an output of the holding circuit in response to the first signal from the flashing light source detecting circuit, while outputting an output of the ratio signal generating means in response to the second signal. A white balance adjusting circuit performs white balance adjustment in accordance with an output from the switch circuit. Thus, when the light source is a flashing one which flashes over the prescribed number of times, no white balance adjustment is performed on the basis of a signal in an OFF state of the light source.

10 Claims, 10 Drawing Sheets

AUTOMATIC WHITE BALANCE CIRCUIT CAPABLE OF EFFECTIVELY ADJUSTING WHITE BALANCE UNDER A FLASHING LIGHT SOURCE

BACKGROUND OF THE INVENTION

1. Field of the Invention

The present invention relates to an automatic white balance circuit which is employed for a color video camera, a color electronic camera or the like.

2. Description of the Background Art

In the image of an object taken by a color video camera, for example, the white balance is varied with ratios between color components of light which is applied to the object. Therefore, the white balance must be adjusted following change in the ratios between such color components of light which is emitted from a light source, in order to obtain a color image of high quality in a color video camera. To this end, an automatic white balance circuit is generally employed together with an image pickup element, to measure the ratios between color components of light which is applied to the object of the image pickup element, for automatically adjusting the white balance on the basis of the result of such measurement.

FIG. 1 is a block diagram showing partial structure of a conventional color video camera having such an automatic white balance circuit. Light from a light source 1 is reflected by an object 2, and supplied to an image pickup element 4 through an optical lens 3. The image pickup element 4 converts the received light into electric signal and supplies the same to a color signal separation circuit 5. The color signal separation circuit 5 separates the electric signal into three electric color signals and supplies the same to a white balance adjusting circuit 15. The white balance adjusting circuit 15 amplifies the respective color signals in response to a white balance control voltage F as hereinafter described, and outputs the same.

The light from the light source 1 is also supplied to color filters 7 and 8. The color filters 7 and 8 have different transmission characteristics, so that different specific color components pass through the color filters 7 and 8, respectively. Light receiving elements 9 and 10 receive the color components and convert the same into currents $I_1$ and $I_2$, respectively. A current-to-voltage conversion circuit (hereinafter referred to as "I-V conversion circuit") 11 converts the current $I_1$ into a logarithmically compressed voltage of $A + B\log I_1$, where A and B represent constants. Another I-V conversion circuit 12 converts the current $I_2$ into a logarithmically compressed voltage of $C + B\log I_2$, where C represents a constant. A subtraction circuit 13 receives the voltages output from the I-V conversion circuits 11 and 12, to output a difference voltage E of $D + B\log(I_1/I_2)$, where D represents a constant. A rectifying circuit 14 integrates the difference voltage E from the subtraction circuit 13. The output of the rectifying circuit 14 is supplied to the white balance adjusting circuit 15 as the white balance control voltage F. The white balance adjusting circuit 15 changes amplification degrees of the respective color signals in response to the white balance control voltage F, to adjust the ratios between the color signals. Thus, the white balance adjusting circuit 15 outputs the color signals, which are subjected to white balance adjustment.

In the conventional color video camera having the aforementioned structure, the following problems are caused when the light source 1 is formed by a flashing one such as a fluorescent lamp, which flashes too instantaneous for visual recognition: As shown in FIG. 3, output voltages X and Y of the I-V conversion circuits 11 and 12 have waveforms which are synchronous to flashing of the light source 1, as shown in FIG. 2. The output voltage E of the subtraction circuit 13 also forms waveshape corresponding to the flashing of the light source 1, as shown in FIG. 2, since each color component of light varies its fading speed when the light source 1 goes off. The aforementioned white balance adjustment is therefore performed by a white balance control voltage F which is integrated signals including an output voltage E of the subtraction circuit 13 when the light source 1 goes off. Meanwhile, when the flashing of the light source 1 is too instantaneous for human eyes, human eyes receive information given when the light source 1 is on, and image pickup element 4 outputs the signal based on information given when the light source 1 is on. However, aforementioned white balance adjustment is still preformed in such a case of the flashing light source described above, whereby the white balance gets rather out of order.

SUMMARY OF THE INVENTION

The present invention is directed to an automatic white balance circuit contained in an image pickup apparatus for automatically adjusting white balance when there is a change in ratios between respective color components included in light applied from a light source to an object picked up by the image pickup apparatus. An automatic white balance circuit according to the present invention comprises ratio signal generating means for receiving the light from the light source to generate and output a ratio signal indicating a ratio between prescribed two of the color components included in the light, a holding circuit connected to the ratio signal generating means for holding and outputting the ratio signal corresponding to a maximum value of illuminance of the light applied from the light source to the object, a flashing light source detecting circuit for detecting a number of flashing times of the light source to output a first signal when the number of flashing times exceeds a prescribed number while outputting a second signal when the former is less than the latter, a switch circuit connected to the ratio signal generating means, the holding circuit and the flashing light source detecting circuit for outputting an output of the holding circuit in response to the first signal from the flashing light source detecting circuit while outputting an output from the ratio signal generating means in response to the second signal, and a white balance adjusting circuit for adjusting white balance in accordance with an output from the switch circuit.

According to the present invention, there is provided a holding circuit for holding an output value from ratio signal generating means corresponding to the maximum illuminance value of light applied from a light source to an object, a flashing light source detecting circuit detecting the number of flashing times of the light source for outputting a first signal when the number of flashing times exceeds a prescribed number while outputting a second signal when the former is less than the latter, and a switch circuit which outputs a signal supplied from the holding circuit in response to the first signal from the flashing light source detecting circuit. The prescribed number is set at a number of flashing times corresponding to a boundary as to whether or not flashing of the light source is visually recognizable, so that white balance adjustment is not performed on the basis of a signal in an OFF state of the light source when the light source is a flashing one which flashes too instantaneous for visual recognition, dissimilarly to the conventional case. Consequently, no deterioration is caused in white balance as the result of white balance adjustment, even if the image of an object is taken under an instantaneous flashing light source whose flashing cannot be visually recognized.

Accordingly, an object of the present invention is to provide an automatic white balance circuit, which can perform correct white balance adjustment even if a light source for applying light to an object is a flashing one which flashes too instantaneous for visual recognition.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
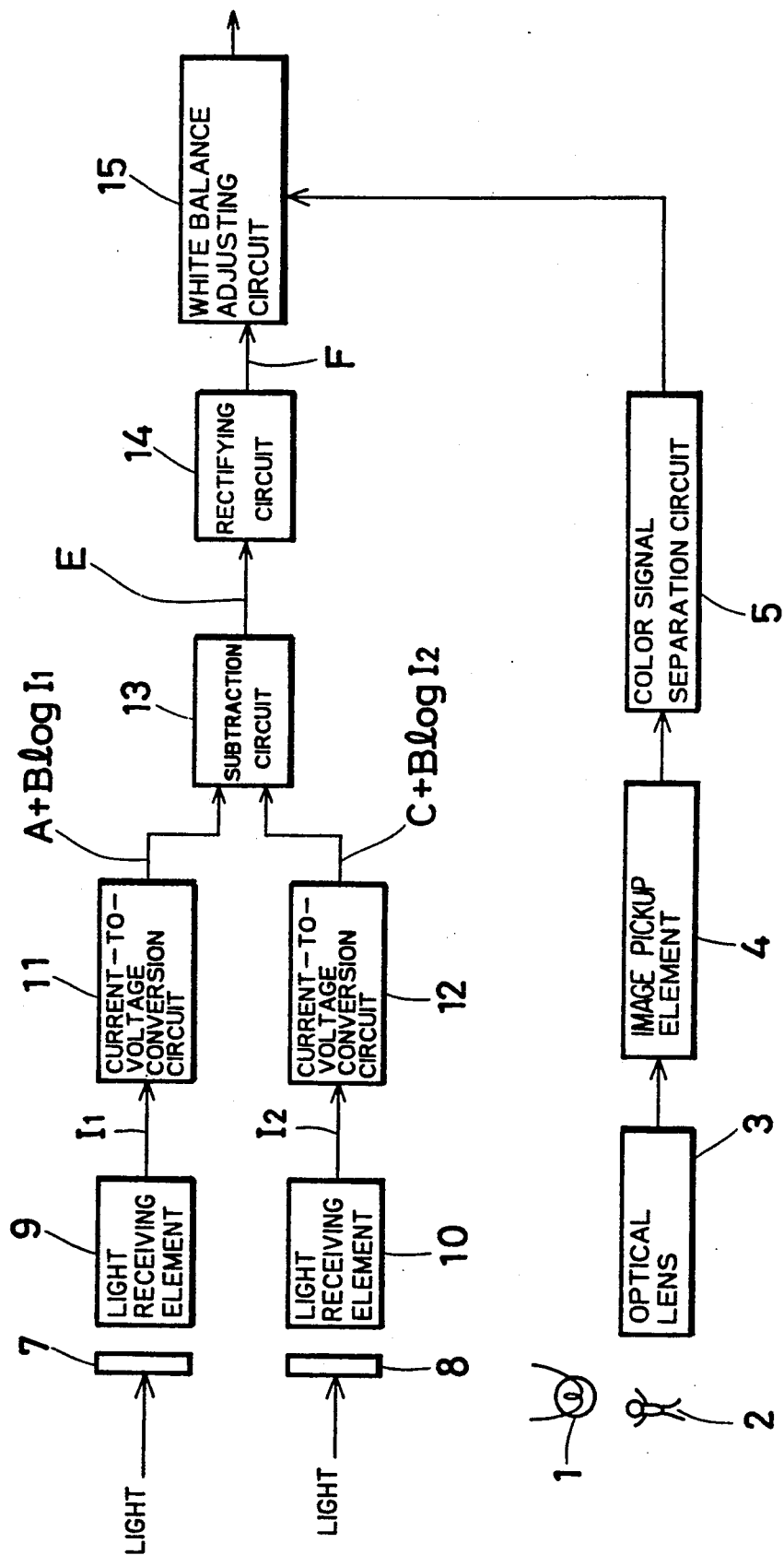
FIG. 1 is a block diagram showing partial structure of a conventional color video camera.
Figure 2:
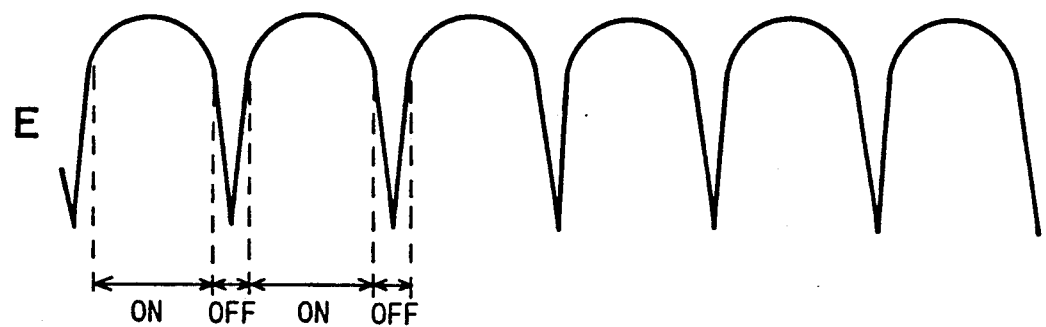
FIG. 2 and FIG. 3 are waveform diagrams for illustrating operation of the circuit shown in FIG. 1.
Figure 4:
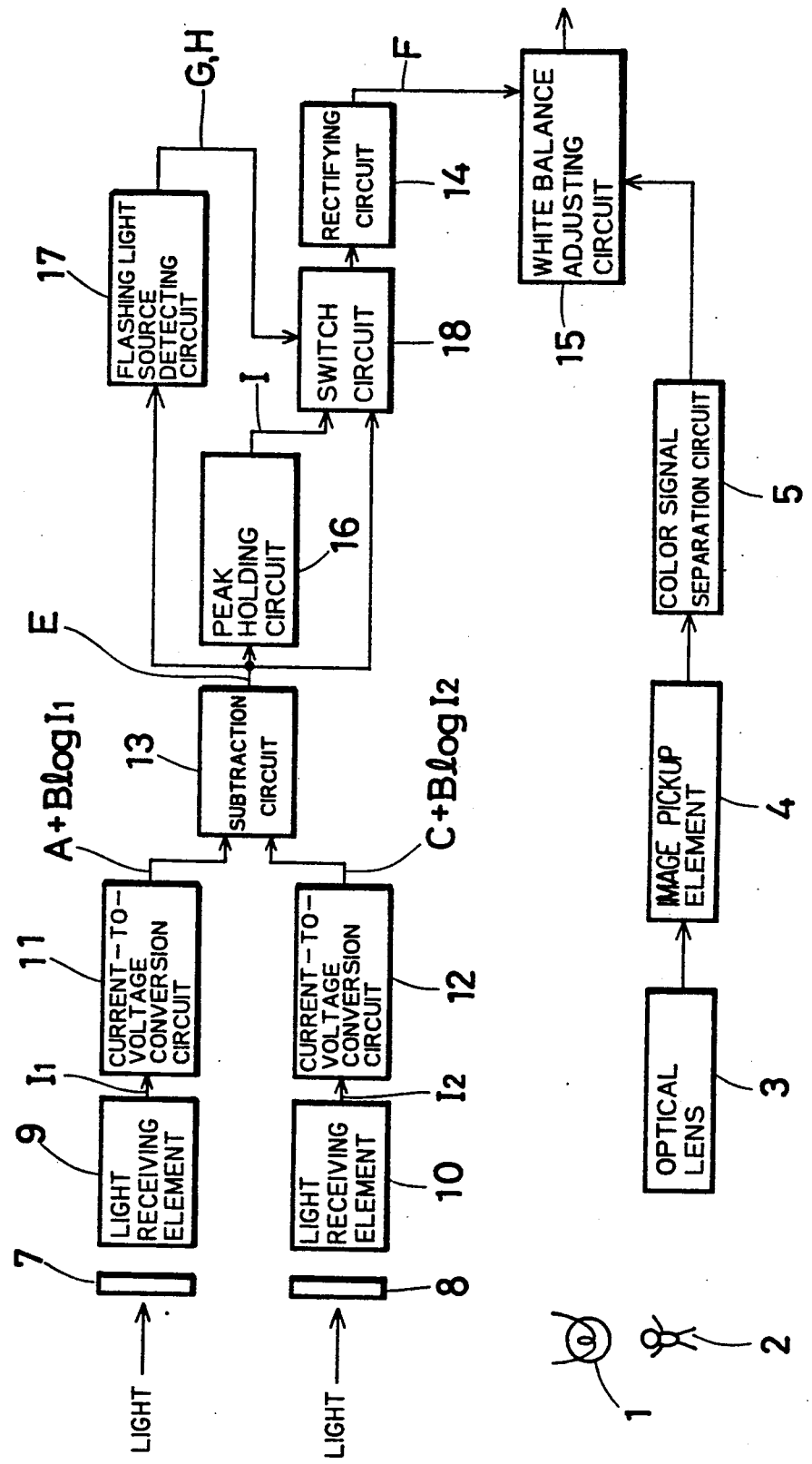
FIG. 4 is a block diagram showing partial structure of a color video camera employing an embodiment of an automatic white balance circuit according to the present invention.
Figure 5:
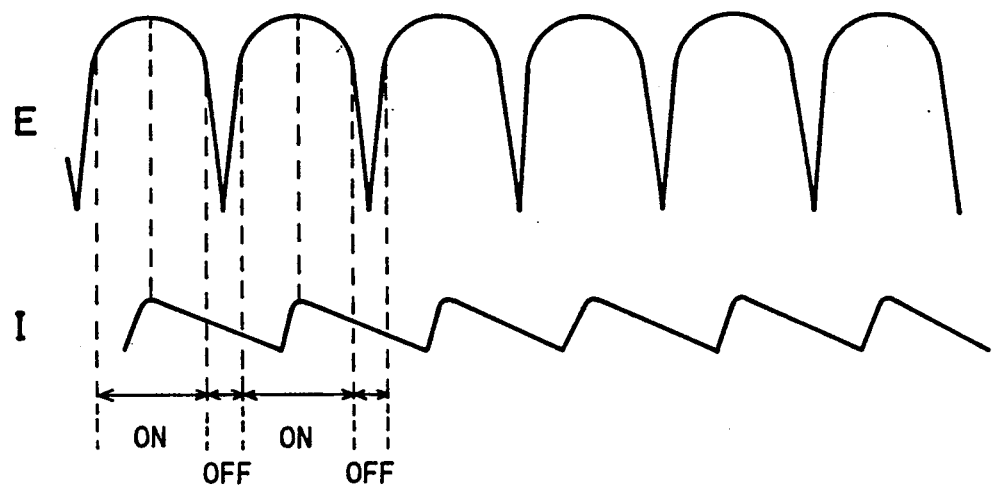
FIG. 5 is a waveform diagram for illustrating operation of the circuit shown in FIG. 4.

FIG. 4 is a block diagram showing partial structure of a color video camera which is provided with an automatic white balance circuit according to an embodiment of the present invention. The structure shown in FIG. 4 is different from the conventional circuit shown in FIG. 1 in that a peak holding circuit 16, a flashing light source detecting circuit 17 and a switch circuit 18 are newly provided.

The peak holding circuit 16 is connected to a subtraction circuit 13, to hold the peak value in an output voltage E of the subtraction circuit 13. The flashing light source detecting circuit 17 is also connected to the subtraction circuit 13, and detects the pulse number per unit time of the output voltage E of the subtraction circuit 13 for outputting a signal G when the pulse number per unit time is not more than a prescribed number while outputting a signal H when the former exceeds the latter.

The switch circuit 18 is connected to the subtraction circuit 13, the peak holding circuit 16 and the flashing light source detecting circuit 17. This switch circuit 18 supplies a rectifying circuit 14 with an output from the subtraction circuit 13 in response to the signal G, or an output from the peak holding circuit 16 in response to the signal H. Other structure of this embodiment is similar to that of the conventional circuit.

Figure 6:
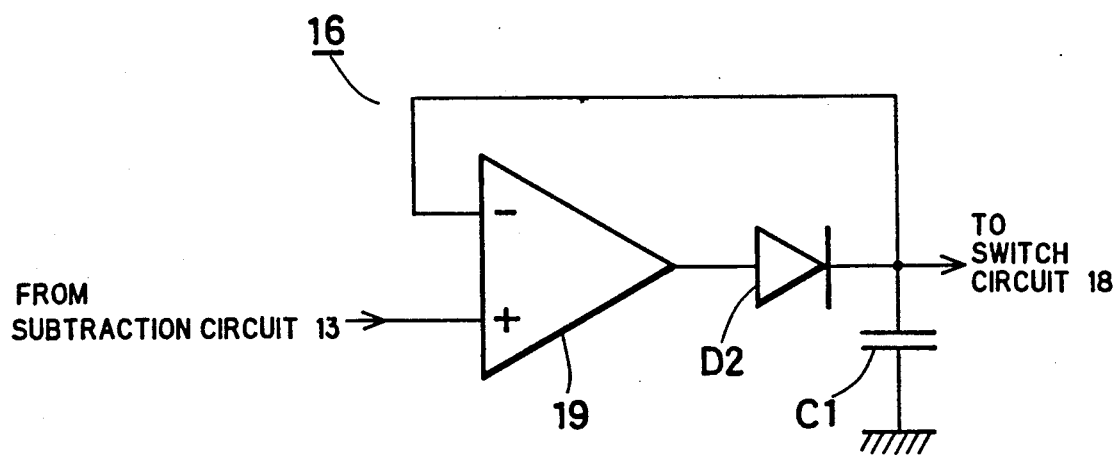
FIG. 6 is a circuit diagram showing exemplary structure of a peak holding circuit.

FIG. 6 is a circuit diagram showing exemplary structure of the peak holding circuit 16. The output from the subtraction circuit 13 is supplied to a plus input of an operational amplifier 19. The output of the operational amplifier 19 is fed back to its minus input through a diode D2. That is, the diode D2 has an anode which is connected to the output of the operational amplifier 19 and a cathode which is connected to the minus input of the operational amplifier 19. The cathode of the diode D2 is also connected to the switch circuit 18, as well as grounded through a capacitor C1.

Figure 7:
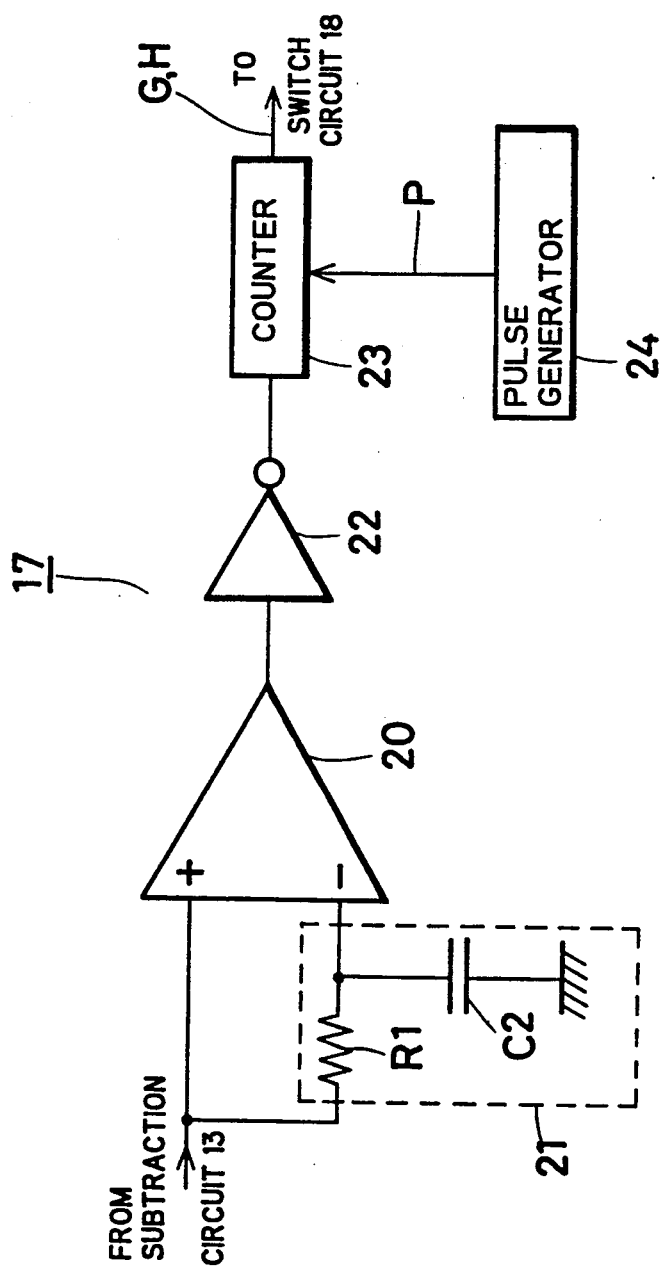
FIG. 7 is a block diagram showing exemplary structure of a flashing light source detecting circuit.

FIG. 7 illustrates exemplary structure of the flashing light source detecting circuit 17. The output voltage of the subtraction circuit 13 is directly received in a plus input of an operational amplifier 20, while being also received in its minus input through a low-pass filter 21 which is formed by a resistor R1 and a capacitor C2. An output from the operational amplifier 20 is supplied to a counter 23 through an inverter 22, which serves as a buffer. The counter 23 counts the number of an output pulse from the inverter 22. A pulse generator 24 supplies a reset pulse P to the counter 23 every second, so that the counter 23 is reset in response to the reset pulse P. Thus, the counter 23 counts the pulse number per second of the output from the inverter 22. The counter 23 outputs the signal G (e.g., low level) when the pulse number per second of the output voltage of the subtraction circuit 13 is not more than a prescribed number, while outputting the signal H (e.g., high level) when the former exceeds the latter, to supply the signals G and H to the switch circuit 18.

Figure 8:
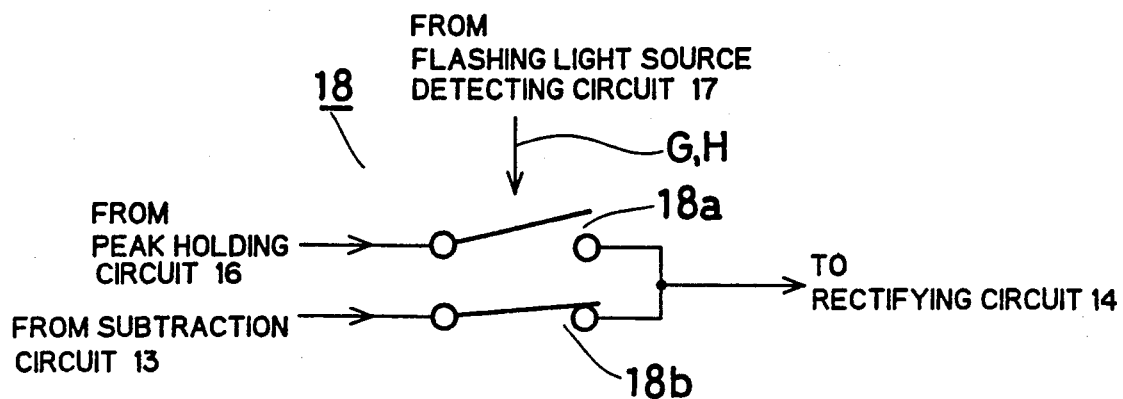
FIG. 8 is a circuit diagram showing exemplary structure of a switch circuit.

FIG. 8 illustrates exemplary structure of the switch circuit 18. In this example, the switch circuit 18 is formed by an analog multiplexer. A switch 18b goes on in response to the signal G, while another switch 18a goes on in response to the signal H. This figure shows such case that the output from the subtraction circuit 13 is supplied to the rectifying circuit 14.

Figure 9:
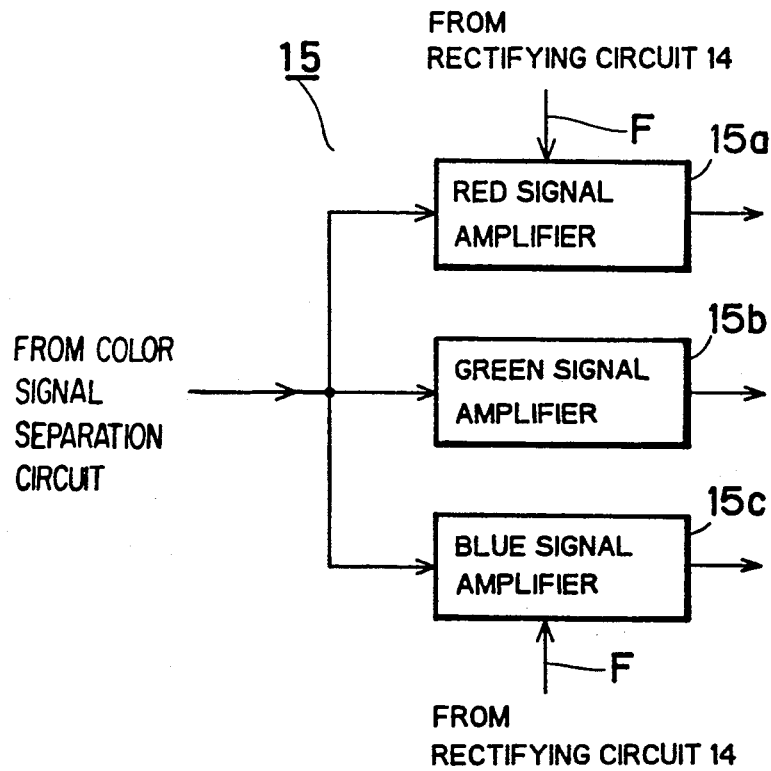
FIG. 9 is a block diagram showing exemplary structure of a white balance adjusting circuit.

FIG. 9 is a block diagram showing exemplary structure of a white balance adjusting circuit 15. Respective color signals from color signal separation circuit 5 are supplied to a red signal amplifier 15a, a green signal amplifier 15b and a blue signal amplifier 15c, respectively. The amplifiers 15a, 15b and 15c amplify and output the corresponding color signals. White balance control voltage F supplied from the rectifying circuit 14 is supplied to the red signal amplifier 15a and the blue signal amplifier 15c. The amplification factors of the red signal amplifier 15a and the blue signal amplifier 15c are adjusted in accordance with the white balance control voltage F. The ratios between red, blue and green signals are thus adjusted to perform white balance adjustment.

Figure 10:
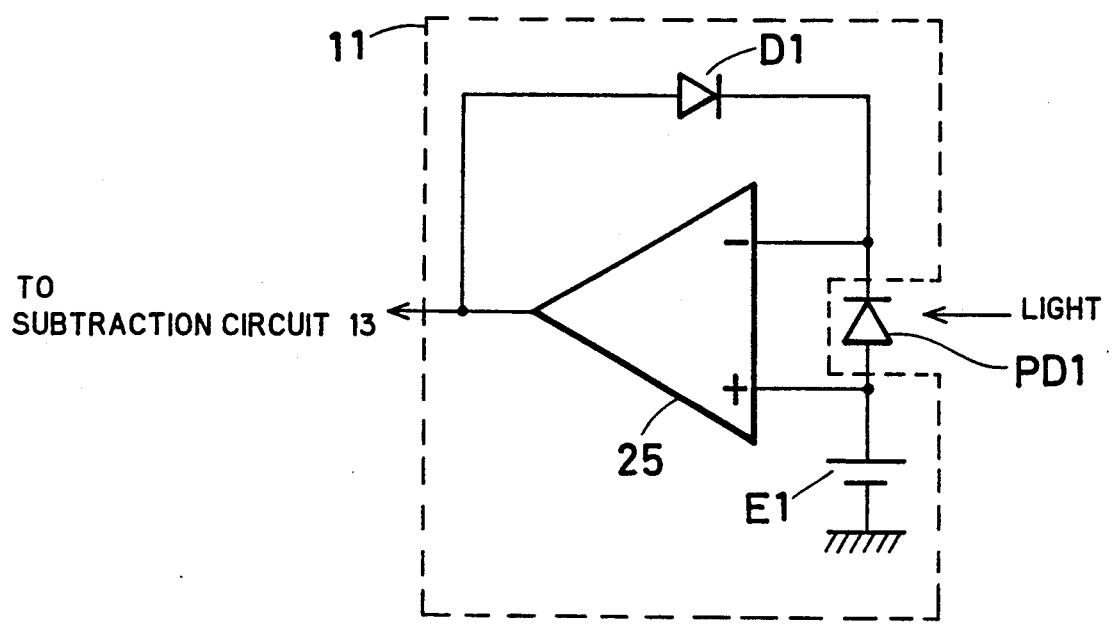
FIG. 10 and FIG. 13 are circuit diagrams showing examples of the structure of a light receiving element combined with an I-V conversion circuit.

FIG. 10 is a circuit diagram showing exemplary structure of a light receiving element 9 and an I-V conversion circuit 11. A photodiode PD1 corresponding to the light receiving element 9 is connected between minus and plus inputs of an operational amplifier 25. The photodiode PD1 has a cathode which is connected to the minus input of the operational amplifier 25 and an anode which is connected to the plus input thereof. The plus input of the operational amplifier 25 is grounded through a power source E1. The output of the operational amplifier 25 is connected to the subtraction circuit 13, while being fed back to its minus input through a diode D1. The diode D1 has a cathode which is connected to the minus input of the operational amplifier 25 and an anode which is connected to the plus input of the operational amplifier 25.

Figure 11:
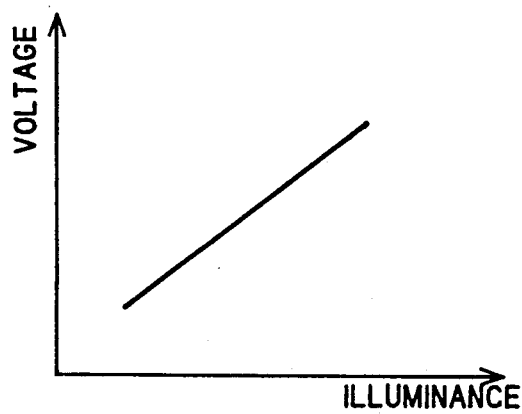
FIG. 11 and FIG. 14 are graphs showing characteristics of the circuits shown in FIG. 10 and FIG. 13, respectively.

FIG. 11 is a graph showing relation between illuminance of light applied to the photodiode PD1 provided in the circuit shown in FIG. 10 and an output voltage of the I-V conversion circuit 11. As shown in FIG. 11, the output voltage of the I-V conversion circuit 11 is linearly increased with increase in illuminance of the light applied to the photodiode PD1. A light receiving element 10 and an I-V conversion circuit 12 are identical in structure to those shown in FIG. 10, and characteristics thereof are also identical to those shown in FIG. 11.

With reference to FIG. 4 to FIG. 9, description will be now made on operation for taking the image of an object 2 through the color video camera having the structure shown in FIG. 4 under a flashing light source.

The light from the light source 1 is reflected by the object 2, and supplied to an image pickup element 4 through an optical lens 3. The image pickup element 4 converts the received light into electric signal and supplies the same to a color signal separation circuit 5. The color signal separation circuit 5 separates the electric signal into three electric color signals (red, green and blue signals), and supplies the same to a white balance adjustment circuit 15. The white balance adjusting circuit 15 amplifies the respective color signals in accordance with the white balance control voltage F as hereinafter described.

The light from the light source 1 is also supplied to color filters 7 and 8. The color filters 7 and 8 have different characteristics so that different specific color components pass through the color filters 7 and 8, respectively. The light receiving elements 9 and 10 receive the corresponding color components and convert the same into currents $I_1$ and $I_2$, respectively. The I-V conversion circuit 11 converts the current $I_1$ into logarithmically compressed voltage of $A + B\log I_1$. The I-V conversion circuit 12 converts the current $I_2$ into logarithmically compressed voltage of $C + B\log I_2$. The subtraction circuit 13 receives output voltages of the I-V conversion circuits 11 and 12, to output a difference voltage E of $D + B\log(I_1/I_2)$.

Figure 3:
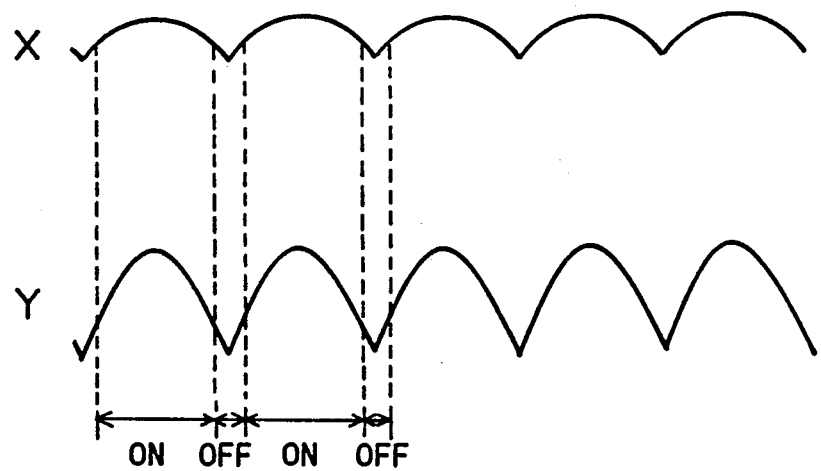

Since the light source 1 is a flashing one, output voltages X and Y of the I-V conversion circuits 11 and 12 have waveforms which are synchronous to flashing of the light source 1, as hereinabove described (see FIG. 3). Therefore, the output voltage E of the subtraction circuit 13 also has a waveform which is synchronous to flashing of the light source 1 (see FIG. 5). The output voltage E of the subtraction circuit 13 is supplied to the peak holding circuit 16, the flashing light source detecting circuit 17 and the switch circuit 18.

The peak holding circuit 16 holds the peak value in the output voltage E of the subtraction circuit 13. Referring to FIG. 6, the output voltage E is received in the plus input of the operational amplifier 19, which in turn buffers and outputs the supplied voltage. The capacitor C1 is charged in response to the value of the output voltage from the operational amplifier 19. The charging voltage of the capacitor C1 is maximized at the peak of the output voltage E of the subtraction circuit 13. When the output voltage of the operational amplifier 19 is reduced after the charging voltage of the capacitor C1 is maximized, the diode D2 goes off since its cathode voltage exceeds anode voltage. In other words, the switch circuit 18 is regularly supplied with a voltage which is responsive to the peak value in the output voltage E of the subtraction circuit 13, i.e., the maximum charging voltage of the capacitor C1. A charging path for the capacitor C1 is cut off when the diode D2 goes off. Therefore, the charging voltage of the capacitor C1 is slightly attenuated for the leakage current of capacitor C1, while such attenuated voltage is compensated by re-charging at a next peak of the output voltage E of the subtraction circuit 13. The aforementioned operation is repeated so that an output voltage I of the peak holding circuit 16 has a waveform shown in FIG. 5. Thus, the peak holding circuit 16 holds the peak value of the output voltage E from the subtraction circuit 13.

The flashing light source detecting circuit 17 detects the pulse number of the output voltage E from the subtraction circuit 13, to output a signal responsive to the detected number. Referring to FIG. 7, the output voltage E of the subtraction circuit 13 is directly received in the plus input of the operational amplifier 20, while being received in its minus input through the low-pass filter 21. The output voltage E of the subtraction circuit 13 is smoothed by passing through the low-pass filter 21. The smoothed output voltage E of the subtraction circuit 13 is utilized as a threshold value to binarize the output voltage E as follows: The operational amplifier 20 compares the output voltage of the subtraction circuit 13 received in the plus input thereof, with a DC voltage received in the minus input thereof. The operational amplifier 20 outputs a high level when the output voltage E of the subtraction circuit 13 is larger than the DC voltage, while outputting a low level when the former is smaller than the latter. The output from the operational amplifier 20 is supplied to the counter 23 through the inverter 22, which serves as a buffer.

The counter 23 counts the pulse number of the output voltage of the operational amplifier 20 received through the inverter 22. The pulse generator 24 supplies a reset pulse P to the counter 23 every second. The counter 23 is reset in response to the reset pulse P. Thus, the counter 23 counts the pulse number per second of the output from the operational amplifier 20. The number of flashing times of the light source 1 per second can be recognized by detecting this pulse number per second. The counter 23 outputs the signal G (e.g., low level) when the pulse number per second is not more than a prescribed number, while outputting the signal H (e.g., high level) when the former exceeds the latter. The term "prescribed number" herein used indicates the number of flashing times of the light source 1 per second, which is the boundary as to whether or not flashing of the light source 1 is visually recognizable. The signal G or H is supplied to the switch circuit 18.

The switch circuit 18 selectively outputs the output voltage E of the subtraction circuit 13 or the output voltage I of the peak holding circuit 16, in response to the signal G or H. Referring to FIG. 8, when the signal G is supplied to the switch circuit 18, the switch 18b responsively goes on so that the output voltage E of the subtraction circuit 13 is supplied to the rectifying circuit 14. When the signal H is supplied to the switch circuit 18, on the other hand, the switch 18a responsively goes on so that the output voltage I of the peak holding circuit 16 is supplied to the rectifying circuit 14.

The rectifying circuit 14 integrates the output voltage of the switch circuit 18, and supplies its integrated output to the white balance adjusting circuit 15 as the white balance control voltage F. In accordance with the voltage value of the white balance control voltage F, the white balance adjusting circuit 15 adjusts the ratios between the color signals by changing amplification factors of the color signals. Referring to FIG. 9, the white balance control voltage F from the rectifying circuit 14 is supplied to the red signal amplifier 15a and the blue signal amplifier 15c. The amplification factors of the red signal amplifier 15a and the blue signal amplifier 15c are adjusted in accordance with the value of the white balance control voltage F. Consequently, the ratios between the red, blue and green signals are adjusted to perform white balance adjustment.

In the case where the light source 1 is a flashing one which flashes too instantaneous for visual recognition, the switch circuit 18 outputs the output voltage I of the peak holding circuit 16 when the light source 1 goes off, and hence no white balance adjustment is performed on the basis of the output voltage E of the subtraction circuit 13 in an OFF state of the light source 1. Consequently, white balance adjustment can be correctly performed.

Figure 12:
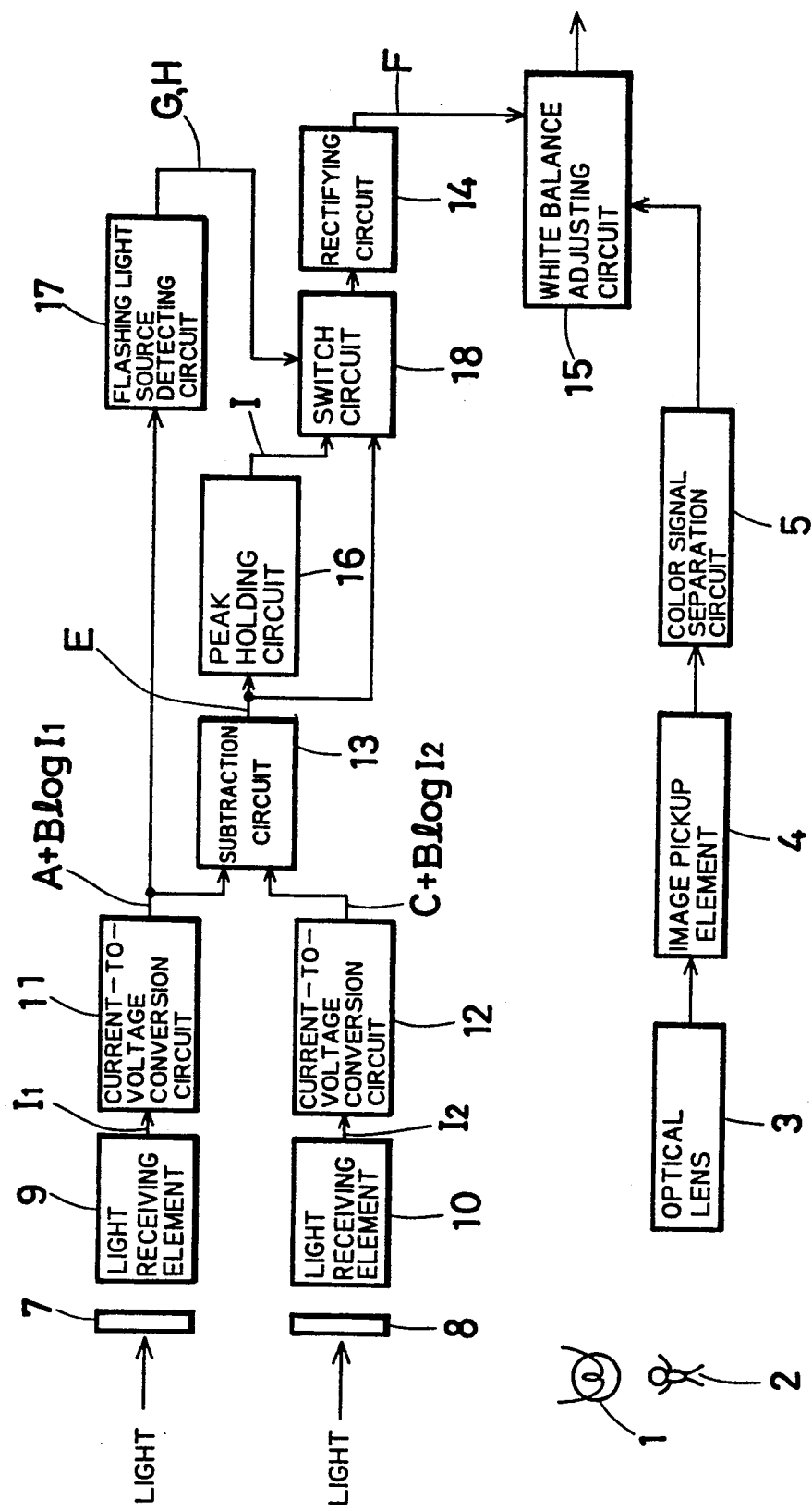
FIG. 12 is a block diagram showing another embodiment of the present invention.

FIG. 12 is a block diagram showing another embodiment of the present invention. In this embodiment, a flashing light source detecting circuit 17 is connected to an output of an I-V conversion circuit 11. An output voltage of the I-V conversion circuit 11 has a waveform which is synchronous to flashing of a light source 1 (see FIG. 3). Therefore, the number of flashing times of the light source 1 per unit time can be detected by the flashing light source detecting circuit 17, similarly to the aforementioned embodiment. The flashing light source detecting circuit 17 may be connected to an output of another I-V conversion circuit 12. Further, the flashing light source detecting circuit 17 may be connected to an output of a light receiving element 9 or 10. Output currents from the light receiving elements 9 and 10 have waveforms which are synchronous to flashing of the light source 1. Therefore, the number of flashing times of the light source 1 per unit time can be detected by the flashing light source detecting circuit 17, similarly to the aforementioned embodiment.

Figure 13:
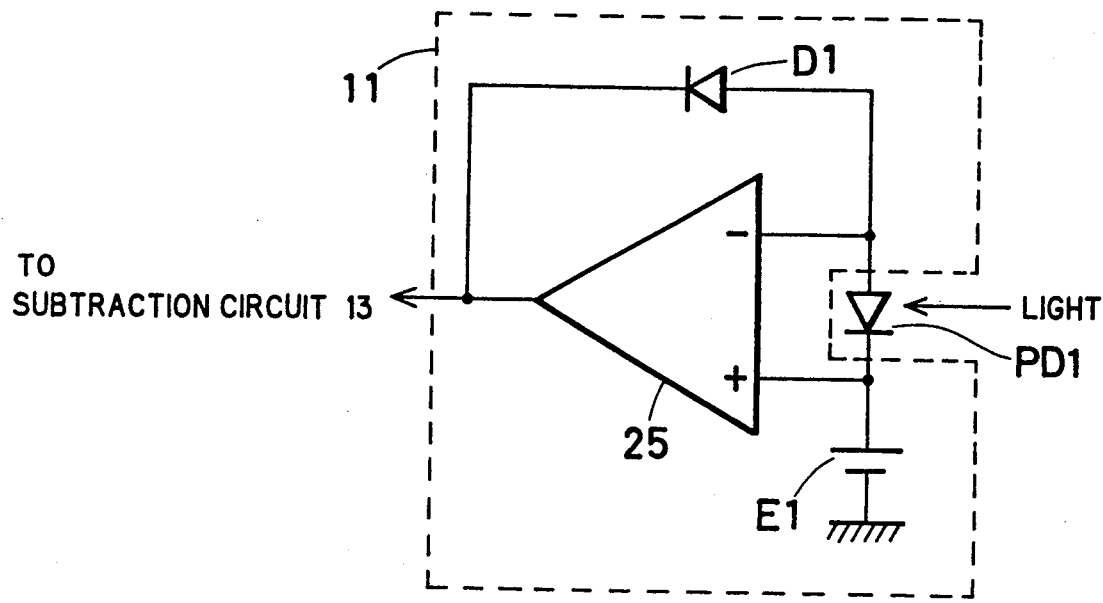
Figure 14:
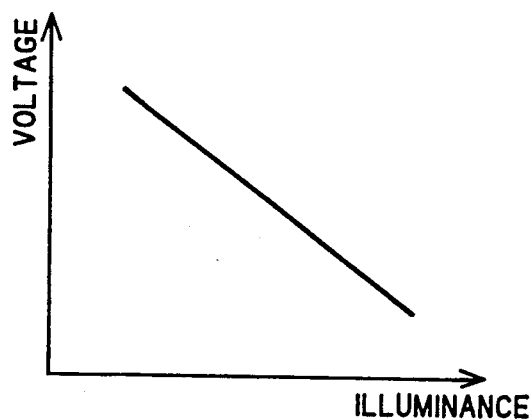
Figure 15:
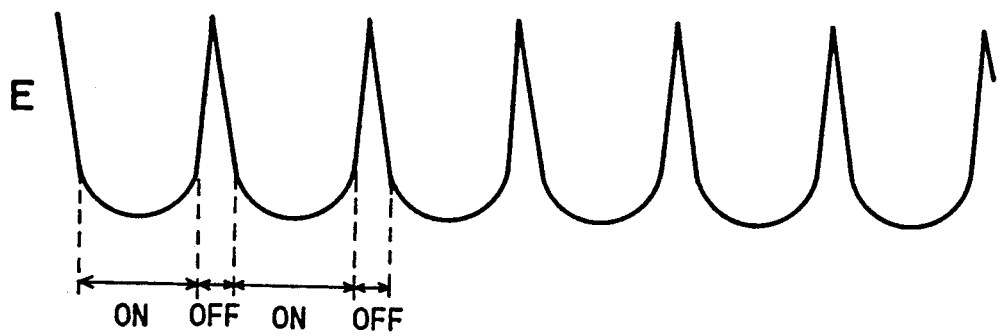
FIG. 15 is an output voltage waveform diagram of a subtraction circuit in the case of structuring a light receiving element and an I-V conversion circuit as shown in FIG. 13.

Although the light receiving element 10 and the I-V conversion circuits 11 and 12 are in the structure shown in FIG. 10 in the aforementioned embodiment, a photodiode PD1 and a diode D1 may be inverted in polarity to those shown in FIG. 10, as shown in FIG. 13. FIG. 14 is a graph showing relationship between illuminance of light which is applied to the photodiode PD1 and output voltages of I-V conversion circuits 11 and 12 having the structure shown in FIG. 13. It is understood from this graph that the output voltages of the I-V conversion circuits 11 and 12 are linearly reduced with increase in illuminance of the light applied to the photodiode PD1. When the light source 1 applying the light to the photodiode PD1 is a flashing one, therefore, an output voltage E of a subtraction circuit 13 has a waveform shown in FIG. 15. That is, the output voltage E of the subtraction circuit 13 is minimized when the illuminance of the light emitted from the light source 1 is maximized. In the above structure, a bottom holding circuit for holding the bottom value of the output voltage E of the subtraction circuit 13 may be provided in place of the peak holding circuit 16.

Figure 16:
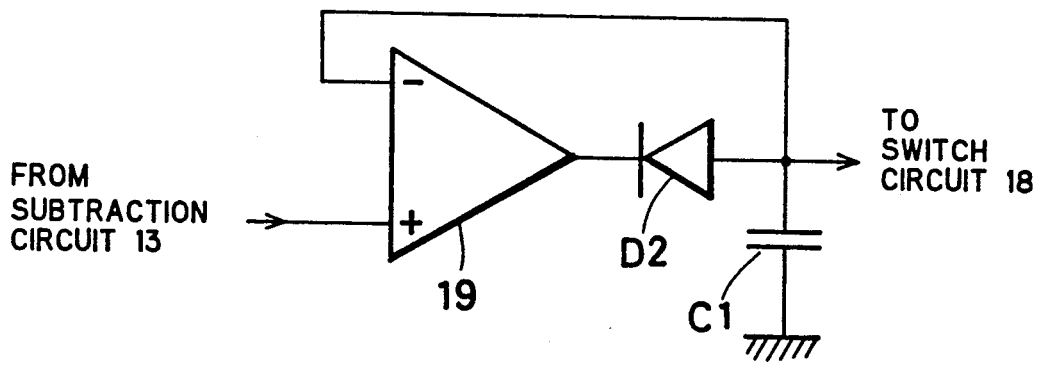
FIG. 16 is a circuit diagram showing exemplary structure of a bottom holding circuit.

FIG. 16 is a circuit diagram showing exemplary structure of the aforementioned bottom holding circuit. In this structure, the diode D2 of the peak holding circuit 16 shown in FIG. 6 is inverted in polarity. Namely, a diode D2 has a cathode which is connected to an output of an operational amplifier 19 and an anode which is grounded through a capacitor C1 as well as connected to a switch circuit 18. The anode of the diode D2 is further connected to a minus input of the operational amplifier 19. It is assumed that the output voltage E of the subtraction circuit 13, which has the waveform shown in FIG. 15, received in the plus input of the operational amplifier 19. A capacitor C1 is charged at this time, and the diode D2 goes off when the charging voltage thereof goes smaller than an output voltage of the operational amplifier 19. Therefore, the switch circuit 18 is supplied with a voltage which is responsive to the bottom value of the output voltage E, i.e., the minimum charging voltage of the capacitor C1. Thus, the bottom holding circuit holds the bottom value of the output voltage E of the subtraction circuit 13.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic white balance circuit contained in an image pickup apparatus for automatically adjusting white balance when there is a change in ratios between respective color components included in light applied from a light source to an object picked up by said image pickup apparatus, said automatic white balance circuit comprising:

ratio signal generating means for receiving said light from said light source to generate and output a ratio signal indicating a ratio between prescribed two of said color components included in said light;

a holding circuit connected to said ratio signal generating means for holding and outputting said ratio signal corresponding to a maximum value of illuminance of said light applied from said light source to said object;

a flashing light source detecting circuit for detecting a number of flashing times of said light source to output a first signal when said number of flashing times exceeds a prescribed number while outputting a second signal when the former is less than the latter;

a switch circuit connected to said ratio signal generating means, said holding circuit and said flashing light source detecting circuit for outputting an output of said holding circuit in response to said first signal from said flashing light source detecting circuit while outputting an output from said ratio signal generating means in response to said second signal; and a white balance adjusting circuit for adjusting white balance in accordance with an output from said switch circuit.

2. An automatic white balance circuit in accordance with claim 1, wherein
said ratio signal generating means comprises:
first and second filters having different transmission characteristics for extracting first and second color components from said light,
first and second light receiving elements operatively coupled to said first and second filters for generating first and second currents according to magnitudes of said first and second color components, respectively,
first and second current-to-voltage conversion circuits connected to said first and second light receiving elements for converting said first and second currents into first and second voltages, respectively, and
a subtraction circuit connected to said first and second current-to-voltage conversion circuits for generating a difference voltage of said first and second voltages.

3. An automatic white balance circuit in accordance with claim 1, wherein
said holding circuit comprises:
a first operational amplifier having a first input connected to said ratio signal generating means, a second input and an output,
a first diode having a first end connected to said output of said first operational amplifier and a second end connected to said second input of said first operational amplifier, and
a capacitor connected across said second end of said first diode and ground.

4. An automatic white balance circuit in accordance with claim 1, wherein
said flashing light source detecting circuit comprises:
a binarizing means connected to said ratio signal generating means for binarizing said ratio signal to generate output pulses, and
a count means connected to said binarizing means for counting said output pulses to output said first signal when a number of said output pulses is greater than said prescribed number and said second signal when the former is smaller than the latter.

5. An automatic white balance circuit in accordance with claim 1, wherein
said switch circuit comprises:
a first switch having first and second ends connected to said holding circuit and said white balance adjusting circuit, respectively, and a control input connected to said flashing light source detecting circuit, which is turned on in response to said first signal to supply an output of said holding circuit to said white balance adjusting circuit, and
a second switch having first and second ends connected to said ratio signal generating means and said white balance adjusting circuit, respectively, and a control input connected to said flashing light source detecting circuit, which is turned on in response to said second signal to supply said ratio signal to said white balance adjusting circuit.

6. An automatic white balance circuit in accordance with claim 1, wherein
said image pickup apparatus includes an image pickup element for receiving light reflected by said object to generate color signals corresponding to color components included in said light reflected,
said white balance adjusting circuit comprising amplifiers coupled to said image pickup element for amplifying said color signals, respectively, wherein an amplification factor of at least one of said amplifiers is changed according to an output of said switch circuit.

7. An automatic white balance circuit in accordance with claim 2, wherein
each of said first and second light receiving elements includes a photodiode,
each of said first and second current-to-voltage conversion circuits comprises
a second operational amplifier having first and second inputs connected across a corresponding of said photodiodes and an output connected to said subtraction circuit,
a second diode connected across said first input of said second operational amplifier and said output of said second operational amplifier, and
a power source connected across said second input of said second operational amplifier and ground.

8. An automatic white balance circuit in accordance claim 4, wherein
said binarizing means comprises:
a low-pass filter connected to said ratio signal generating means for smoothing said ratio signal, and
a third operational amplifier having first and second inputs connected to said ratio signal generating means and said low-pass filter, respectively, and an output, for binarizing said ratio signal on the basis of an output of said low-pass filter to generate said output pulses.

9. An automatic white balance circuit in accordance with claim 8, wherein
said count means comprises:
a pulse generator for generating a reset pulse every predetermined time, and
a counter coupled to said output of said third operational amplifier and said pulse generator for counting said output pulses while being reset in response to said reset pulse to detect the number of said output pulses in said predetermined time, to output said first signal when the number of said output pulses in said predetermined time is greater than said prescribed number and said second signal when the former is smaller than the latter.

10. An automatic white balance circuit in accordance with claim 2, wherein
said flashing light source detecting circuit has an input connected to one of said first and second current-to-voltage conversion circuits, said first and second light receiving elements and said subtraction circuit to receive an output thereof to detect the number of flashing times of said light source.

* * * * *